United States Patent
Blerkom et al.

(10) Patent No.: US 6,870,565 B1
(45) Date of Patent: Mar. 22, 2005

(54) SEMICONDUCTOR IMAGING SENSOR ARRAY DEVICES WITH DUAL-PORT DIGITAL READOUT

(75) Inventors: Daniel Van Blerkom, Burbank, CA (US); Alexander Krymski, Montrose, CA (US); Abe Kotlyar, Sun Valley, CA (US); Nikolai Bock, Pasadena, CA (US); Anders Andersson, Pasadena, CA (US); Barmak Mansoorian, Los Angeles, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/449,194

(22) Filed: Nov. 24, 1999

Related U.S. Application Data

(60) Provisional application No. 60/109,922, filed on Nov. 24, 1998.

(51) Int. Cl.[7] ............................ H04N 3/14; H04N 5/335
(52) U.S. Cl. ...................................................... 348/294
(58) Field of Search ........................................... 348/294

(56) References Cited

U.S. PATENT DOCUMENTS

| | | | | |
|---|---|---|---|---|
| 5,757,520 A | * | 5/1998 | Takashima ................... 358/513 |
| 5,880,691 A | * | 3/1999 | Fossum et al. ............. 341/162 |
| 5,886,659 A | * | 3/1999 | Pain et al. ................... 341/155 |
| 5,926,215 A | * | 7/1999 | Whipple et al. ............ 348/280 |
| 6,021,172 A | * | 2/2000 | Fossum et al. ................ 377/60 |
| 6,115,065 A | * | 9/2000 | Yadid-Pecht et al. ........ 348/308 |
| 6,133,563 A | * | 10/2000 | Clark et al. .............. 250/208.1 |
| 6,552,745 B1 | * | 4/2003 | Perner ......................... 348/308 |
| 6,573,936 B2 | * | 6/2003 | Morris et al. ................ 348/294 |

* cited by examiner

*Primary Examiner*—Wendy R. Garber
*Assistant Examiner*—Janas M. Hannett
(74) *Attorney, Agent, or Firm*—Dickstein Shapiro Morin & Oshinsky LLP

(57) ABSTRACT

Imaging sensors having dual-port for digital readout to pipeline readout processes of two different groups of pixels.

23 Claims, 6 Drawing Sheets

SEMICONDUCTOR IMAGING SENSOR ARRAY DEVICES WITH DUAL-PORT DIGITAL READOUT

This application claims the benefit of U.S. Provisional Application No. 60/109,922, filed on Nov. 24, 1998.

BACKGROUND

This disclosure is related to semiconductor imaging devices and techniques, and more specifically, to semiconductor imaging arrays with integrated analog-to-digital converters.

A typical semiconductor imaging sensor includes a pixel array of photosensors and associated controlling and processing circuits. An optical image captured by the imaging sensor is first converted into analog electrical signals and then processed by the processing circuits in either analog mode or digital mode. In the digital mode, one or more analog-to-digital converters ("ADCs") may be used to convert the analog signals into a digital representation of the image.

The digital readout of the imaging sensors may be delayed by the limited bandwidth and limited transfer speed of the readout bus. Such readout delay can be particularly prominent when the number of pixels is large.

SUMMARY

The present semiconductor imaging devices include readout devices and techniques based on a dual-port configuration in which two readout memory units are used to pipeline the reading from associated sensing pixels and writing to the readout bus. The reading data from the sensor array and writing data to the readout bus can be at least partially overlapped in time and hence to reduce the delay.

One embodiment includes a sensing array having a plurality of sensing pixels; at least one analog-to-digital converter (ADC) coupled and configured to convert an analog pixel signal from said sensing array into a digital pixel signal of a plurality of bits, and a first memory cell and a second memory cell each operable to store at least one digital pixel signal. Each pixel of the sensing array has a radiation sensor to produce an analog pixel signal in response to radiation.

The first and second memory cells are coupled to read a first digital pixel signal generated from a first sensing pixel into one of said first and second memory cells while the other memory cell outputs a second digital pixel signal that is generated from a second different sensing pixel and is converted by said ADC before conversion of said first digital pixel signal. Hence, the readout processes of two different pixels are overlapped in time to increase the readout speed.

BRIEF DESCRIPTION OF THE DRAWINGS

These and other aspects will now be described in detail with respect to the accompanying drawings, wherein.

DETAILED DESCRIPTION

A semiconductor imaging device may integrate an imaging sensor array of multiple sensing pixels, and certain controlling and processing circuits on a single semiconductor substrate. Analog-to-digital conversion function may also be integrated by forming one or more ADCs on the same substrate where the sensing pixels are located. Such integrated imaging devices with on-chip ADCs can be used to reduce the size, power consumption, and manufacturing cost. Such ADC integration can also improve the device reliability, noise immunity (e.g., cross talk, clock pickup, electromagnetic interference), and chip-to-chip interfacing (e.g., from the sensor to a computer).

Figure 1:
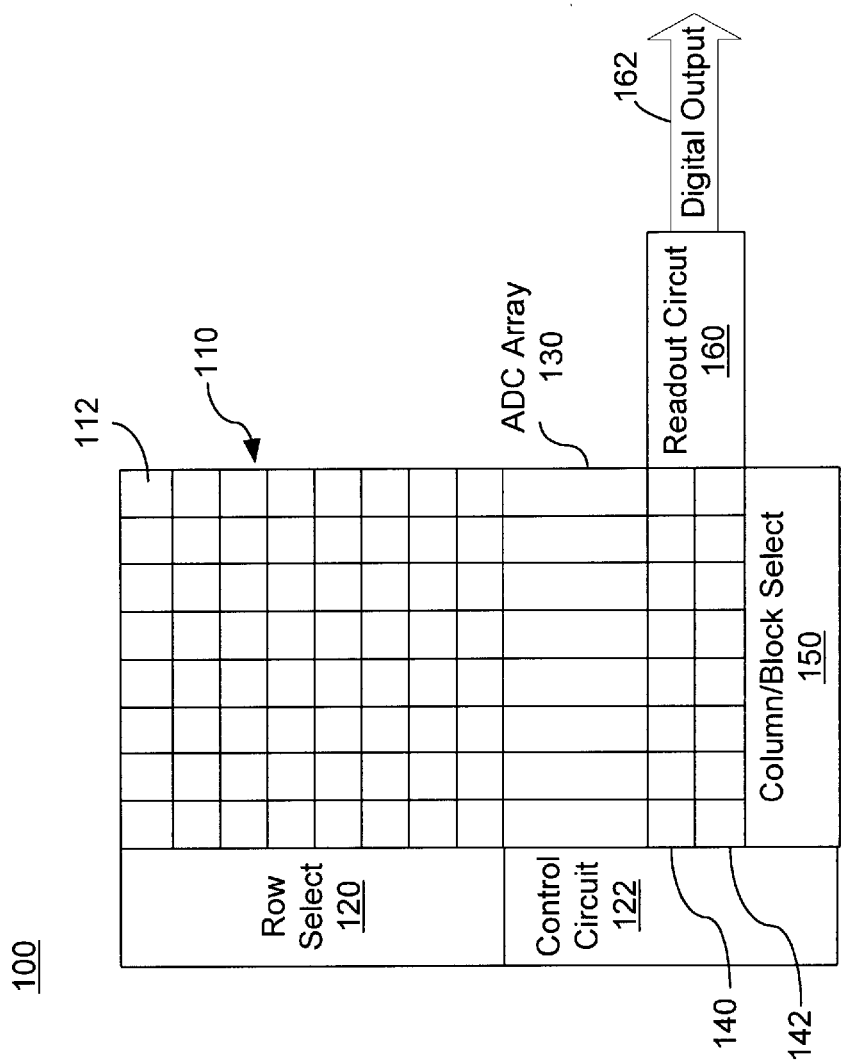
FIG. 1 shows one embodiment of an integrated semiconductor imaging device with a dual-port digital readout.

FIG. 1 shows an embodiment of a semiconductor imaging device 100 with on-chip ADCs. A sensor array 110 includes an array of sensing pixels 112 in rows and columns fabricated over a semiconductor substrate. Each sensing pixel includes a semiconductor photosensor to convert received radiation into an electrical signal (e.g., electric charge, voltage or current). Pixel addressing circuits, row select 120 and column and block select 150, are integrated on the same substrate to address any one or a block of multiple pixels and to retrieve signals from selected pixels. The column and block select 150 can be configured to select a block of columns at a time for readout.

The photosensor in each pixel for the array 110 may be any suitable photo-sensing element. For example, a photo transistor, a photodiode, a photogate, a CCD detector, a charge injection device, or a hybrid focal plane array may be used to construct the photosensor. In particular, a CMOS active pixel sensor ("APS") may be used to implement the sensing pixel 112. This APS sensor includes a light sensing element, at least a follower transistor, and a selection transistor within the pixel itself. The transistors amplify and buffer the signals generated by the light sensing element.

One type of such APS devices is disclosed in U.S. Pat. No. 5,471,515 to Fossum et al. This CMOS APS device is capable of producing a reset signal (Vrst) of a pixel prior to an integration and a signal (Vsig) of that pixel at the end of the integration period. Hence, the reset signal Vrst represents non-photon-induced background level in the pixel and the signal Vsig includes both the reset signal and the photon-induced signal. The difference between the reset signal Vrst and the signal Vsig is the photo-induced signal for that pixel and is free of KTC noise and fixed pattern noise.

The imaging device 100 implements on-chip analog-to-digital conversion in a "column-parallel" configuration where the sensing pixels of different rows in each column share one designated ADC. A one-dimensional ADC array 130 is formed next to the sensing array on the substrate. Each ADC may be the type that converts all bits at the same time or the type that converts one bit or a portion of bits at a time in a sequential manner. In the configuration shown in FIG. 1, each ADC in the ADC array 130 is electrically coupled to the sensing pixels of a single column. Hence, the number of ADCs in the array 130 is equal to the number of columns in the analog sensor array 110. The ADC array 130 operates, in parallel, to convert the analog signals from one row of pixels 112 at a time. Alternatively, the number of ADCs in the ADC array 130 may be less than the number of columns, so that one ADC is connected to two or more columns by multiplexing. In either configuration, all ADCs are in parallel with respect to one another.

The above integration of ADCs in parallel can reduce the clock rate at which each integrated ADC in the array 130 operates to achieve the full video frame comparing to analog circuits with an off-chip serial ADC. The parallel on-chip ADC architecture also alleviate effects of clock noise and other capacitively-coupled noise sources that are known to increase with increasing data rates. In addition, this architecture provides a compromise between reduction of the ADC operation rate and reducing pixel size.

Two random-access memory ("RAM") arrays 140 and 142 are coupled to the ADC array 130 of the imaging device 100 to form a dual-port digital readout. A readout circuit 160 is coupled to at least one of the RAM arrays 140 and 142 via a readout bus to drive the digital output 162. Each RAM array has the same number of RAM cells as the ADCs in the ADC array 130. Each RAM cell is connected to only one corresponding ADC. Thus, one ADC is connected to two RAM cells in the RAM arrays 140 and 142, respectively.

The two RAM arrays 140 and 142 are controlled to store digital data from two different groups of pixels during the readout. As one RAM array is retrieving data from one group of pixels coupled to the ADC array 130, the data stored in another RAM array from a different group of pixels that are previous read by the ADC array 130 is being readout. Thus, the time for reading data from one group of pixels to one RAM array and the time for sending out data of a different group of pixels stored in another RAM array are overlapped to reduce the readout time. When the bandwidth and speed of the readout bus are fixed, this pipelining of reading two different groups of pixels by the dual-port configuration can increase the readout speed of the imaging device 100. A control circuit 122 may be implemented on the chip to control the operations of different components.

Figure 2:
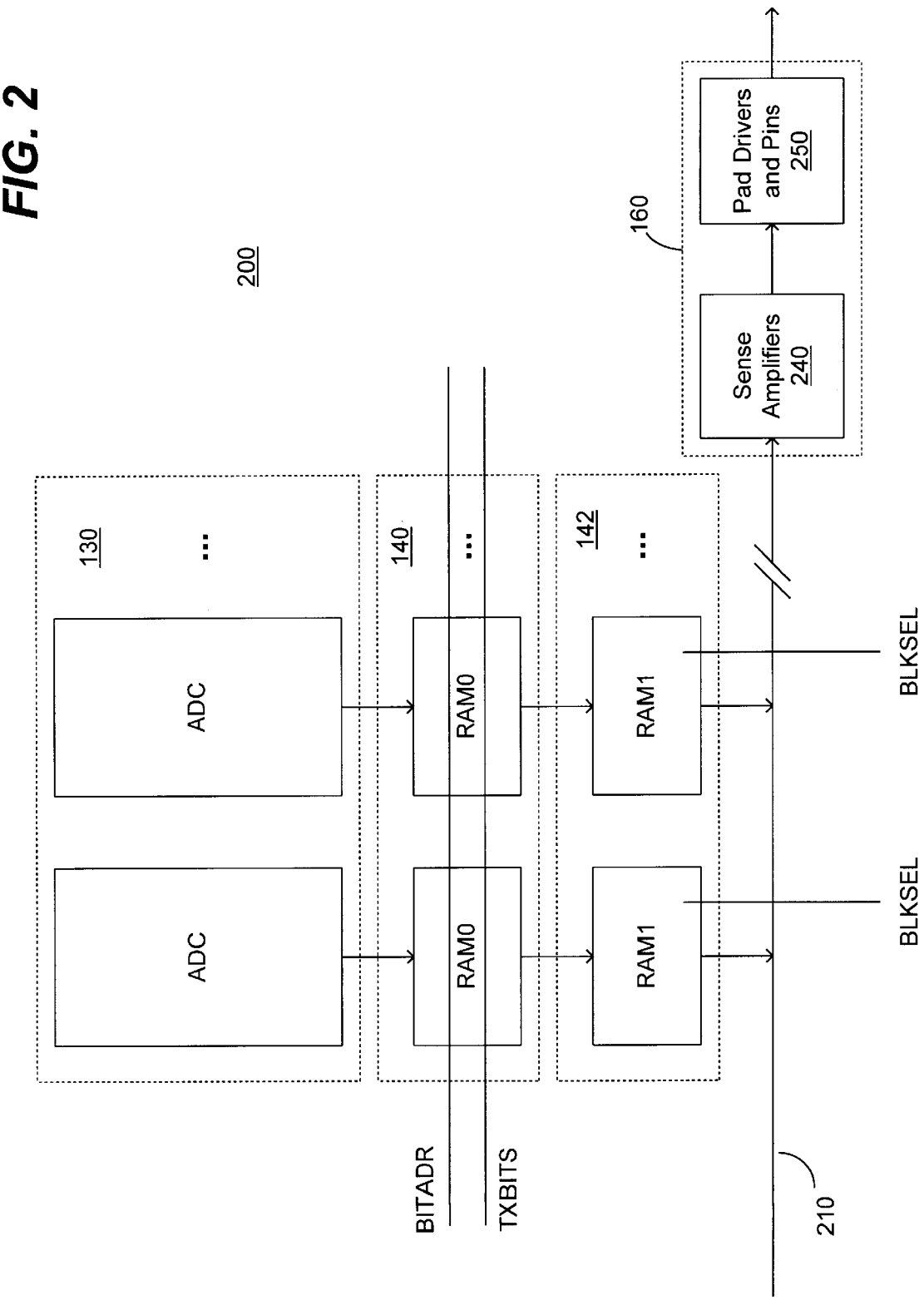
FIG. 2 shows one implementation of the dual-port digital readout of FIG. 1 by using two RAM arrays in series.

FIG. 2 shows one implementation 200 of the dual-port configuration shown in FIG. 1. RAM cells RAM0 and RAM1 of the arrays 140 and 142 are configured to have the capacity to store at least the bits for one pixel signal. Each RAM cell RAM0 in the RAM array 140 is connected between a respect ADC in the ADC array 130 and a respective RAM cell RAM1 in the RAM array 142 as a temporary buffer to store a newly converted datum from a pixel of one row in its corresponding column. The RAM cell RAM 1 stores a converted datum of another pixel in the same column that is converted by the ADC in the previous cycle of operation. Only the RAM cells RAM1 are connected to a readout bus 210 of the readout circuit 160.

In operation, each ADC converts a first pixel into a digital signal. The bits of the converted signal are then read into the RAM cell RAM0. A bit address line is connected to the RAM cell RAM0 to place the bits in their respective bit positions in the RAM cell RAM0 based on a command BITADR. Upon completion of storing the pixel signal from the ADC, a transfer bit command, TXBITS, is issued to copy all stored bits from RAM0 into RAM1. Next, two operations are simultaneously executed. First, the RAM0 is retrieving data bits from the next pixel whose analog signal has been converted by the ADC. Secondly, the bits in RAM1 are being read out by the readout circuit 160. After the bits in RAM1 are sent out, the above process is then repeated until all pixels are converted and read. Hence, the readout processes of two adjacent pixels are overlapped in time while the data from each pixel is streamed from the ADC, to the RAM0, and then to the RAM1 in each column.

The readout bus 210 may be a single bit line which transmits one bit at a time. But this is slow. Preferably, the bus 210 includes multiple bit lines so that multiple bits can be simultaneously transferred. Accordingly, the readout circuit 160 includes a sensing amplifier 240 and a pad driver and pins 250 for each bit line of the readout bus 210.

In one implementation, the bus 210 can simultaneously carry bits of multiple pixel signals from a block of selected columns. Different blocks of columns are thus read out by the circuit 160 in sequence, one block at a time. A block selection command, BLKSEL, is used to select a block of columns for readout. In another implementation, the bus 210 may include a sufficient number of bit lines to carry the bits from all columns so that all data bits in the RAM array 142 can be read out at the same time.

Figure 3:
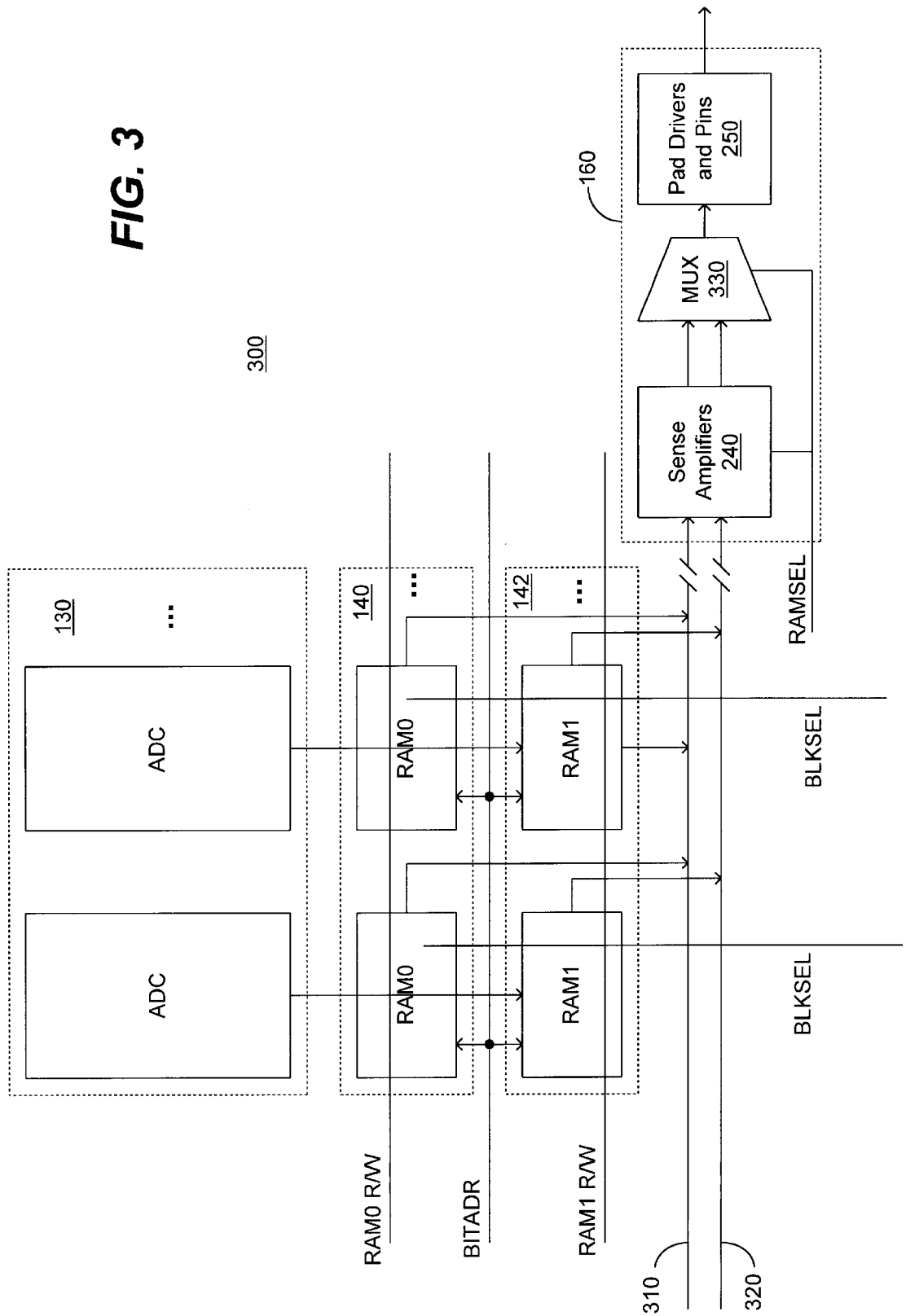
FIG. 3 shows another implementation of the dual-port digital readout of FIG. 1 by using two RAM arrays in parallel.

FIG. 3 shows an alternative implementation 300 of the dual-port configuration shown in FIG. 1 where the RAM arrays 140 and 142 are both coupled to the readout circuit 160. Two separate readout buses 310 and 320 are used, each dedicated to carry the data from one of the two RAM arrays 140 and 142. The RAM cells RAM0 and RAM1 in each column are connected to receive data from the respective ADC and to write data to their respective buses 310 and 320. The bit address line BITADR is now coupled to both RAM cells RAM0 and RAM1 in each column. In addition, two command lines, RAM0 R/W and RAM1 R/W, are respectively added to the RAM cells RAM0 and RAM1 to allow the RAM arrays 140 and 142 to alternatively receive data from the ADC array 130. Hence, when one RAM array is commanded to receive data from the ADC array 130, the other RAM array is commanded to write its data to its readout bus. A multiplexer 330 is coupled to the buses 310 and 320 to select a proper bus between the buses 310 and 320 for readout in response to a command RAMSEL.

In operation, the readout processes of two sequentially-read pixels in one column are overlapped in time, similar to the implementation 200 shown in FIG. 2. The commands, RAM0 R/W and RAM1 R/W, are designed to control one RAM array to read data from the ADC array 130 converted from one row of pixels while the other RAM array writes data Assume the RAM cells RAM0 in the RAM array 140 are used to receive data from the ADC array 130 converted from a preceding row of pixels. Also similar to the implementation 200, the readout buses 310 and 320 may be designed to simultaneously carry bits of signals of a selected block of columns or all columns.

Figure 5:
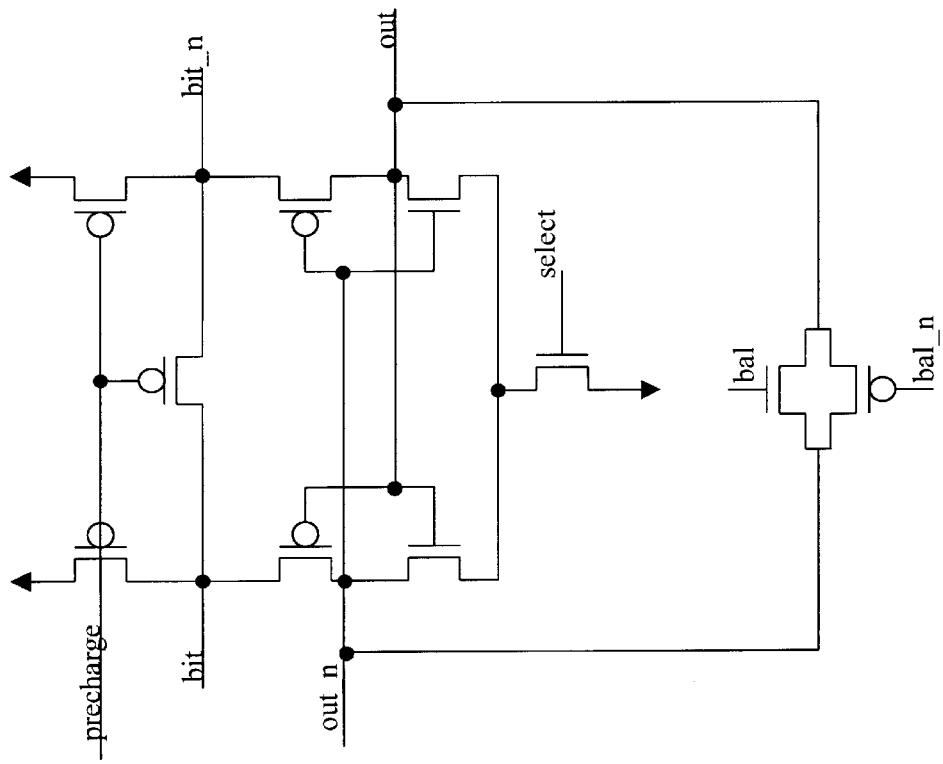
FIG. 5 shows one embodiment of a sensing amplifier used in FIGS. 2 and 3.
Figure 4:
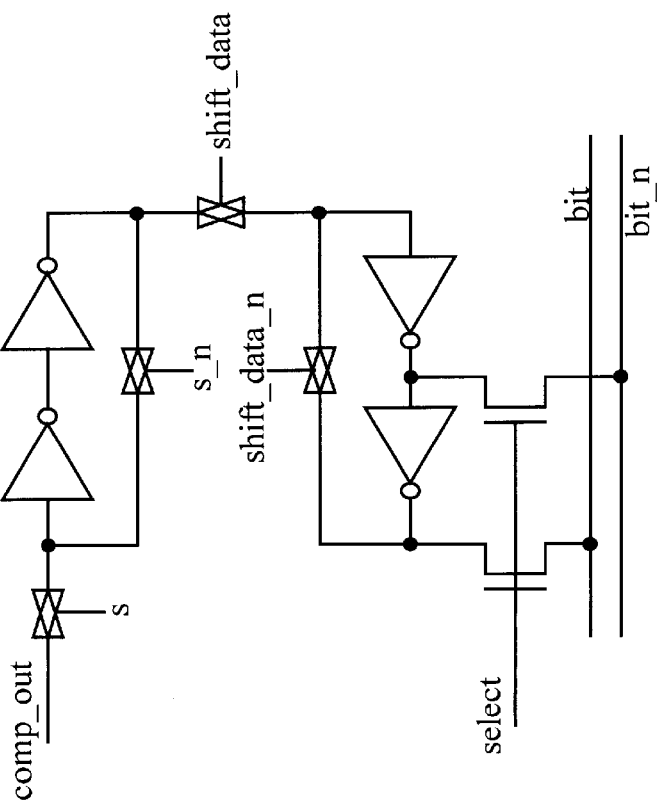
FIG. 4 shows a static RAM design of the two RAM arrays of FIG. 2.

The RAM cells in the RAM arrays 140 and 142 may be any suitable RAM design. Both dynamic and static RAM cells may be used. FIG. 4 shows one embodiment of static RAM cells for RAM0 and RAM1 for the implementation 200 in FIG. 2. The sensing amplifiers 240 may also be implemented in various forms. One example is shown in FIG. 5.

Figure 6:
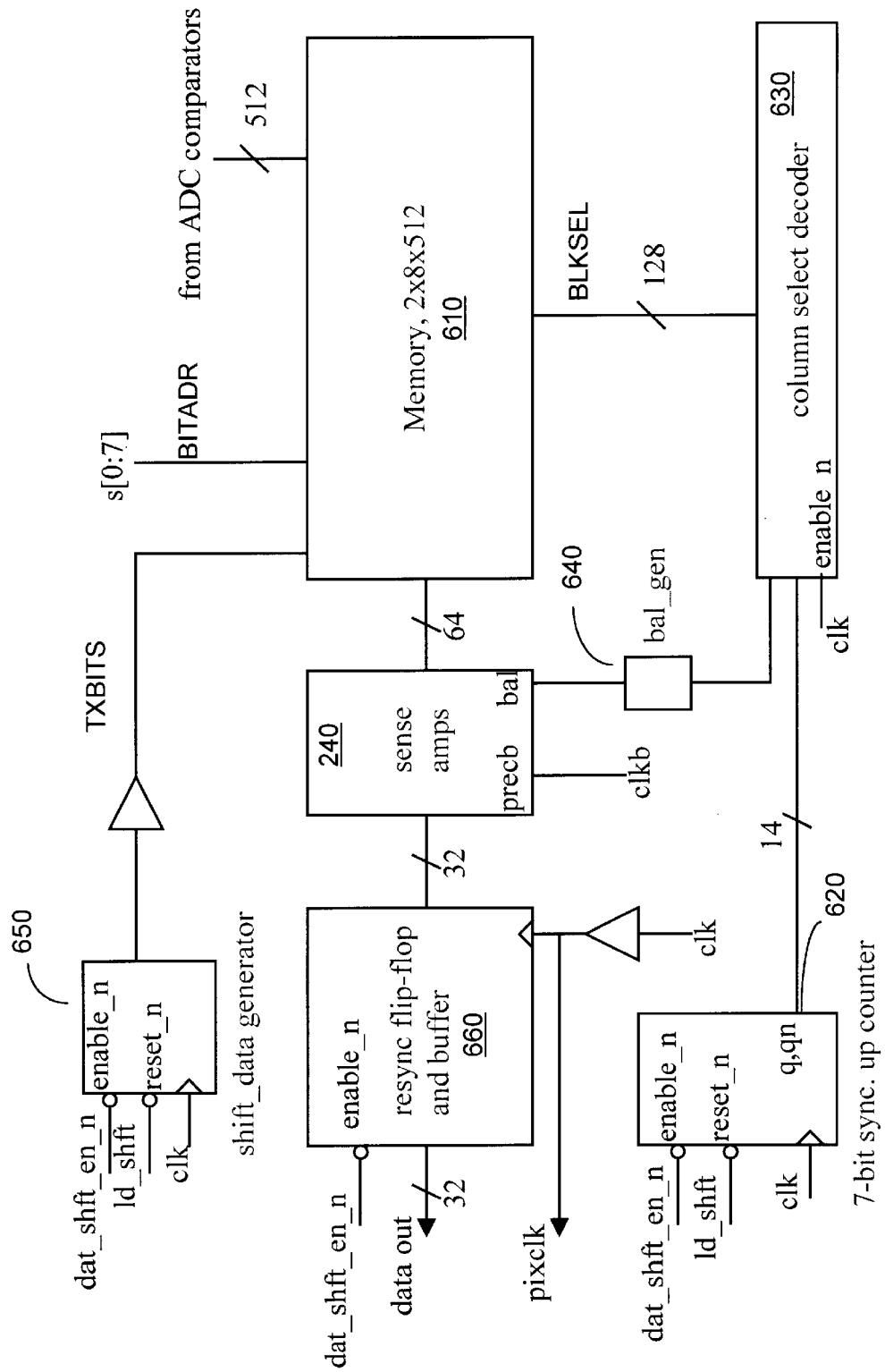
FIG. 6 shows one circuit implementation of the readout portion in FIG. 2.

FIG. 6 shows one embodiment of the readout block for the RAM arrays 140, 142, the block select circuit 150, and the readout circuit 160 shown in FIG. 2. The memory block 610 includes both RAM arrays 140 and 142. A 7-bit synchronous up counter 620 and a column select decoder 630 in combination form the block select circuit 150 of FIG. 1. A delay circuit 640 is used to delay the selection of columns relative to charging up the bit lines in the sensing amplifiers 240 so that the potential in each line of the sensing amplifiers 240 substantially reach its final value to ensue a proper reading in the output. A logic circuit 650 is used to generate the command TXBITS for transferring the data bits from RAM cells in the array 140 to the RAM cells in the array 142. A logic flop-flop and buffer circuit 660 is used to provide the digital output of the imaging device. Low-voltage swing bit lines may be used to represent and transfer each bit by two wires of different potentials in a differential manner. Such two-wire bit lines can improve the readout speed in large arrays and reduce interference with sensitive analog processing circuitry.

The above embodiments separate the RAM arrays 140 and 142 from the ADC array 130 as different circuit blocks on the substrate. This separation can reduce the effects of the noise caused by the high-frequency operations of the RAM cells on the ADC array 130 because the analog portion of the ADC is sensitive to interference. Hence, the accuracy of the analog-to-digital conversion can be improved.

Figure 7:
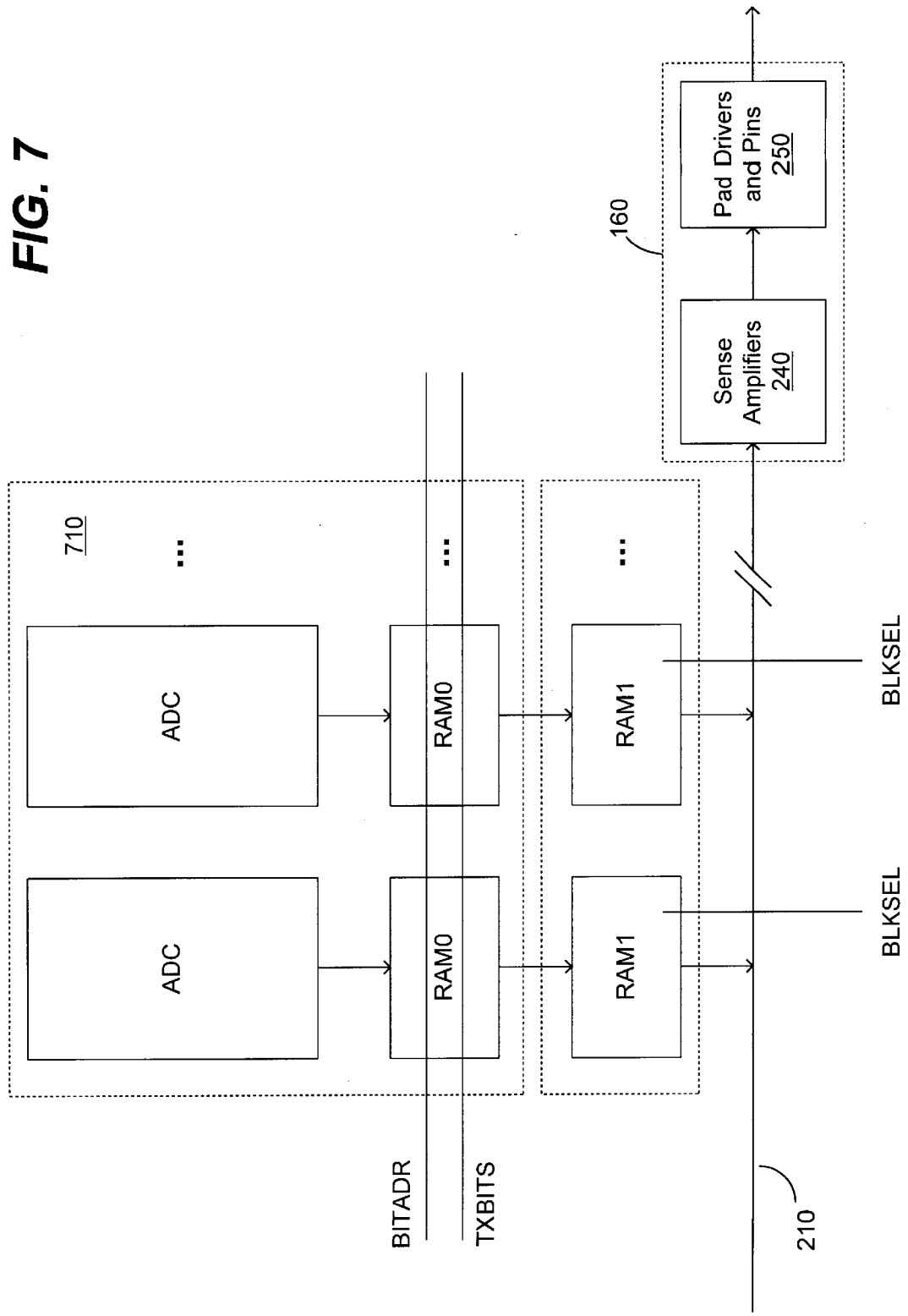
FIG. 7 shows an alternative implementation of the circuit in FIG. 2.

However, when the ADC is the type that converts bits of a signal sequentially (e.g., a successive approximation ADC) in the implementation 200 shown in FIG. 2, the RAM array 140 may operate at a relative low frequency in synchronization with the speed of conversion by the ADC array 130, e.g., about 1 to 5 MHz. Each RAM cell RAM0 may read one bit from the ADC when the conversion of that bit is completed. After all bits of a pixel signal are converted and stored in the RAM0, the corresponding RAM cell RAM1 can transfer the bits from RAM0 at a high frequency (e.g., about 50 to 500 MHz). In this configuration, the RAM cells RAM0 can be integrated with ADC array 130 without significantly affecting the ADC performance and the high-frequency RAM array 142 can be separated. FIG. 7 shows such an implementation where the RAM cells RAM0 are integrated with ADCs in a circuit 710. The circuit 710 may be separated from the high-frequency array 142 by a desired distance on the substrate or by using a guard ring or other means to provide some electrical separation therebetween.

Although only a few embodiments are disclosed, other modifications and variations are possible. For example, the column-parallel ADC array and the readout memory units may not be integrated with the sensing pixels on the same substrate but rather formed on another substrate and electrically coupled to the sensing pixels. Other configurations for implementing analog-to-digital conversion are also possible, e.g., each sensing pixel is coupled to a designated ADC or the entire sensing array has a single ADC to serially convert their analog signals. All these are intended to be encompassed by the following claims.

What is claimed is:

1. A semiconductor imaging device, comprising:
   a sensing array having a plurality of sensing pixels, each pixel configured to have a radiation sensor and to produce an analog pixel signal in response to radiation;
   at least one analog-to-digital converter coupled to said sensing array and configured to convert said analog pixel signals received from said sensing array into respective digital pixel signals, each of said digital pixel signals having a plurality of bits; and
   a first memory cell and a second memory cell, each coupled alternatively to said analog-to-digital converter and operable to store digital pixel signals from said analog-to-digital converter, said first and second memory cells being coupled to read a first digital pixel signal generated from a first sensing pixel into one of said first and second memory cells while the other of said first and second memory cells outputs a second digital pixel signal that is generated from a second different sensing pixel which was converted by said analog-to-digital converter before conversion of said first digital pixel signal.

2. A device as in claim 1, wherein said sensing array is an active pixel array.

3. A device as in claim 1, wherein at least one of said first and second memory cells is a static random access memory cell.

4. A device as in claim 1, wherein at least one of said first and second memory cells is a dynamic random access memory cell.

5. A device as in claim 1, wherein said analog-to-digital converter is a type that converts all bits of an analog pixel signal at the same time.

6. A device as in claim 1, wherein said analog-to-digital converter is a type that converts one or a portion of all bits of an analog pixel signal sequentially.

7. A device as in claim 1, wherein one of said first and second memory cells is integrated with said analog-to-digital converter to form a circuit block that is separated from said other of said first and second memory cells.

8. A method of using a semiconductor imaging device to detect an image of radiation, comprising:
   using a sensing array having a plurality of sensing pixels to receive the image of radiation, each pixel configured to have a radiation sensor and to produce an analog pixel signal in response to radiation;
   converting an analog pixel signal from said sensing array into a first digital pixel signal of a plurality of bits by using at least one analog-to-digital converter;
   determining which of first and second memory cells both selectively coupled to said at least one analog-to-digital converter is to receive said first digital pixel signal from said at least one analog-to-digital converter;
   reading said first digital pixel signal generated from a first sensing pixel into said first memory cell coupled to said analog-to-digital converter; and
   using said second memory cell coupled to said analog-to-digital converter to output a second digital pixel signal that is generated from a second different sensing pixel and is converted by said analog-to-digital converter before conversion of said first digital pixel signal.

9. A method as in claim 8, further comprising:
   alternating said first and second memory cells to receive new digital pixel signals from said analog-to-digital converter.

10. A method as in claim 8, wherein each pixel of said sensing array further includes a follower transistor and a selection transistor.

11. A method as in claim 8, wherein at least one of said first and second memory cells is a static random access memory cell.

12. A method as in claim 8, wherein at least one of said first and second memory cells is a dynamic random access memory cell.

13. A method as in claim 8, wherein said analog-to-digital converter is a type that converts all bits of an analog pixel signal at the same time.

14. A method as in claim 8, wherein said analog-to-digital converter is a type that converts one or a portion of all bits of an analog pixel signal sequentially.

15. A method as in claim 8, further comprising integrating one of said first and second memory cells with said analog-to-digital converter to form a circuit block that is separated from said other of said first and second memory cells.

16. A semiconductor imaging device, comprising:
   a substrate formed of a semiconductor;
   a sensing array formed on said substrate and having a plurality of sensing pixels, each pixel configured to have a radiation sensor and to produce an analog pixel signal in response to radiation;

a plurality of analog-to-digital converters formed on said substrate, each operable to convert an analog pixel signal from said sensing array into a digital pixel signal, each analog-to-digital converter coupled to a specified group of sensing pixels to perform analog-to-digital conversion; and a first memory array of memory cells formed on said substrate; and a second memory array of memory cells, each memory cell of said first and second memory array being respectively alternatively coupled to one of said plurality of analog-to-digital converters to receive digital pixel signals from said respective ones of said plurality of analog-to-digital converters.

17. A device as in claim 16, wherein said sensing array is an array selected from a group consisting of an active pixel array, a photo transistor array, a photodiode array, a photogate array, a CCD array, a charge injection device array, and a hybrid focal plane array.

18. A device as in claim 16, wherein at least one of said first and second memory arrays is a static random access memory array.

19. A device as in claim 16, wherein at least one of said first and second memory arrays is a dynamic random access memory array.

20. A device as in claim 16, wherein each analog-to-digital converter is a type that converts all bits of an analog pixel signal at the same time.

21. A device as in claim 16, wherein each analog-to-digital converter is a type that converts one or a portion of all bits of an analog pixel signal sequentially.

22. A device as in claim 1, further comprising:
a respective command line coupled to each of said first and second memory cells for selecting which of said first and second memory cells is to receive digital pixel signals from said analog-to-digital converter.

23. A device as in claim 22, further comprising:
a first readout bus coupled to said first memory cell; and
a second readout bus coupled to said second memory cell, wherein said first memory cell is configured to write its data to its respective readout bus when said second memory cell is configured to receive digital pixel signals from said analog-to-digital converter.

* * * * *

UNITED STATES PATENT AND TRADEMARK OFFICE
CERTIFICATE OF CORRECTION

PATENT NO. : 6,870,565 B1
DATED : March 22, 2005
INVENTOR(S) : Daniel V. Blerkom et al.

It is certified that error appears in the above-identified patent and that said Letters Patent is hereby corrected as shown below:

Column 3,
Line 7, "alleviate" should read -- alleviates --,
Line 26, "previous" should read -- previously --, Column 4,
Line 40, "data Assume" should read -- data assuming --,
Line 62, "ensue" should read -- ensure --.

Signed and Sealed this

Twenty-first Day of June, 2005

JON W. DUDAS
*Director of the United States Patent and Trademark Office*